(12) United States Patent
Mizes et al.

(10) Patent No.: US 9,216,603 B1
(45) Date of Patent: Dec. 22, 2015

(54) SYSTEM AND METHOD FOR GENERATION OF TEST PATTERNS FOR MEASUREMENT OF PRINTHEAD TO SUBSTRATE SEPARATION IN A PRINTER

(71) Applicant: Xerox Corporation, Norwalk, CT (US)

(72) Inventors: Howard A. Mizes, Pittsford, NY (US); David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/603,817

(22) Filed: Jan. 23, 2015

(51) Int. Cl.
  *B41J 29/38* (2006.01)
  *B41J 25/308* (2006.01)
  *B41J 29/393* (2006.01)
  *B29C 67/00* (2006.01)

(52) U.S. Cl.
  CPC .......... *B41J 29/393* (2013.01); *B29C 67/0059* (2013.01)

(58) Field of Classification Search
  CPC .................. B41J 2/04526; B41J 2029/3935
  See application file for complete search history.

(56) References Cited

U.S. PATENT DOCUMENTS

| | | | |
|---|---|---|---|
| 6,783,201 B2 * | 8/2004 | Ninomiya | B41J 25/308 347/19 |
| 8,485,634 B2 | 7/2013 | Mizes et al. | |
| 8,602,518 B2 | 12/2013 | Mizes et al. | |
| 2005/0280665 A1 * | 12/2005 | Flotats | B41J 11/0095 347/8 |
| 2006/0214976 A1 * | 9/2006 | Iwao | B41J 2/04526 347/19 |
| 2011/0242187 A1 | 10/2011 | Mongeon et al. | |
| 2011/0279505 A1 | 11/2011 | Shin et al. | |
| 2014/0022298 A1 * | 1/2014 | Li | B41J 11/0095 347/19 |

* cited by examiner

*Primary Examiner* — Shelby Fidler
(74) *Attorney, Agent, or Firm* — Maginot Moore & Beck LLP

(57) ABSTRACT

A method of generating a test pattern for use in identification of a z-axis distance between a printhead and a substrate in a three-dimensional object printer includes forming a first predetermined test pattern on a substrate with the printhead and generating image data of the first test pattern. The method further includes identifying cross-process direction offsets of marks in the image data of the first test pattern and generating second test pattern data for the printhead using only a portion of the ejectors in the printhead and not including a mark from at least one ejector in the printhead with a cross-process direction offset that is less than another cross-process direction offset of at least one ejector in the portion of the ejectors.

16 Claims, 8 Drawing Sheets

SYSTEM AND METHOD FOR GENERATION OF TEST PATTERNS FOR MEASUREMENT OF PRINTHEAD TO SUBSTRATE SEPARATION IN A PRINTER

TECHNICAL FIELD

This disclosure is directed to three-dimensional object printing systems and, more particularly, to systems and methods of identification and control of the relative position of printheads with a support member or upper layer of a printed object along a z-axis.

BACKGROUND

Three-dimensional printing, also known as additive manufacturing, is a process of making a three-dimensional solid object from a digital model of virtually any shape. Many three-dimensional printing technologies use an additive process in which successive layers of the part are built on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

During production of three-dimensional printed objects with an inkjet printer, the printer adjusts the relative position of one or more printheads within a comparatively narrow range distances from a surface of a substrate that receives the build material. In some instances the substrate is a support member in the three-dimensional object printer, while in other instances the substrate is an upper layer of an object that is formed in the three-dimensional object printer. The printer adjusts the relative distance between the printheads and the support member that holds the object to enable the printheads to print additional layers of material on an upper layer of the object as the printer forms the object from a series of layers of a build material. The printer controls the position of the printheads to ensure that the printheads are close enough to a surface of the substrate for precise and accurate placement of drops of the build material. The printer also controls the position of the printheads to maintain sufficient separation between the printhead and the substrate, which prevents the printed object from contacting the printhead which would result in clogging of the nozzles preventing the future firing or causing misfiring of the jets in addition to damage of the object being built.

During operation of a three-dimensional object printer, at least one of the support member or the printheads moves along the z-axis during the object printing process to accommodate the printed object that extends from the support member toward the printheads. Accurate measurements of the distance between the support member or upper layer of the object and the printheads enable the printheads to operate with improved precision and reliability. Consequently, improved systems and methods for identifying and controlling the separation between printheads and support members or objects in a three-dimensional object printer would be beneficial.

SUMMARY

In one embodiment, a method of generating a test pattern used in identification of a z-axis distance between a printhead and a substrate in a three-dimensional object printer has been developed. The method includes operating with a controller a plurality of ejectors in a printhead with reference to stored image data to form a first predetermined test pattern including a first plurality of marks arranged in a cross-process direction on a surface of a substrate, generating with an image sensor first generated image data of the first plurality of marks on the substrate, identifying with the controller a plurality of cross-process direction offsets for the first plurality of marks in the first generated image data of the first predetermined test pattern, each cross-process direction offset being identified with reference to a difference between a location of a mark in the first generated image data and a predetermined location of the mark in the stored image data referenced to form the first predetermined test pattern, generating with the controller second test pattern data that correspond to a second plurality of marks arranged in the cross-process direction to be formed by only a portion of the plurality of ejectors in the printhead and without a mark formed by at least one other ejector in the plurality of ejectors, the mark corresponding to the at least one other ejector having an identified cross-process direction offset that is less than another identified cross-process direction offset of at least one ejector in the portion of the plurality of ejectors in the printhead, and storing with the controller the second test pattern data in a memory for operation of the portion of the plurality of the ejectors to enable identification of a z-axis distance between the printhead and the substrate, the z-axis being perpendicular to the surface of the substrate.

In another embodiment, a three-dimensional object printer that is configured to generate a test pattern used in identification of a z-axis distance between a printhead and a substrate has been developed. The method includes a printhead having a plurality of ejectors configured to eject drops of a material onto a surface of a substrate, an actuator configured to move at least one of the substrate and the printhead along a z-axis, an image sensor configured to generate image data of the surface of the substrate and test patterns formed on the substrate, a memory, and a controller operatively connected to the printhead, the actuator, the image sensor, and the memory. The controller being is configured to operate the plurality of ejectors in the printhead with reference to image data stored in the memory to form a first predetermined test pattern including a first plurality of marks arranged in a cross-process direction on the surface of the substrate, generate with the image sensor first generated image data of the first plurality of marks on the substrate, identify a plurality of cross-process direction offsets for the first plurality of marks in the first generated image data of the first predetermined test pattern, each cross-process direction offset being identified with reference to a difference between a location of a mark in the first generated image data and a predetermined location of the mark in the stored image data referenced to form the first predetermined test pattern, generate second test pattern data that correspond to a second plurality of marks arranged in the cross-process direction to be formed by only a portion of the plurality of ejectors in the printhead and without a mark formed by at least one other ejector in the plurality of ejectors, the mark corresponding to the at least one other ejector having an identified cross-process direction offset that is less than another identified cross-process direction offset of at least one ejector in the portion of the plurality of ejectors in the printhead, and store the second test pattern data in the memory for operation of the portion of the plurality of the ejectors to enable identification of a z-axis distance between the printhead and the substrate, the z-axis being perpendicular to the surface of the substrate.

BRIEF DESCRIPTION OF THE DRAWINGS

The foregoing aspects and other features of an apparatus or printer that generates printed test patterns for use in identification of z-direction distances between one or more printheads and a substrate during operation are explained in the following description, taken in connection with the accompanying drawings.

DETAILED DESCRIPTION

Figure 1A:
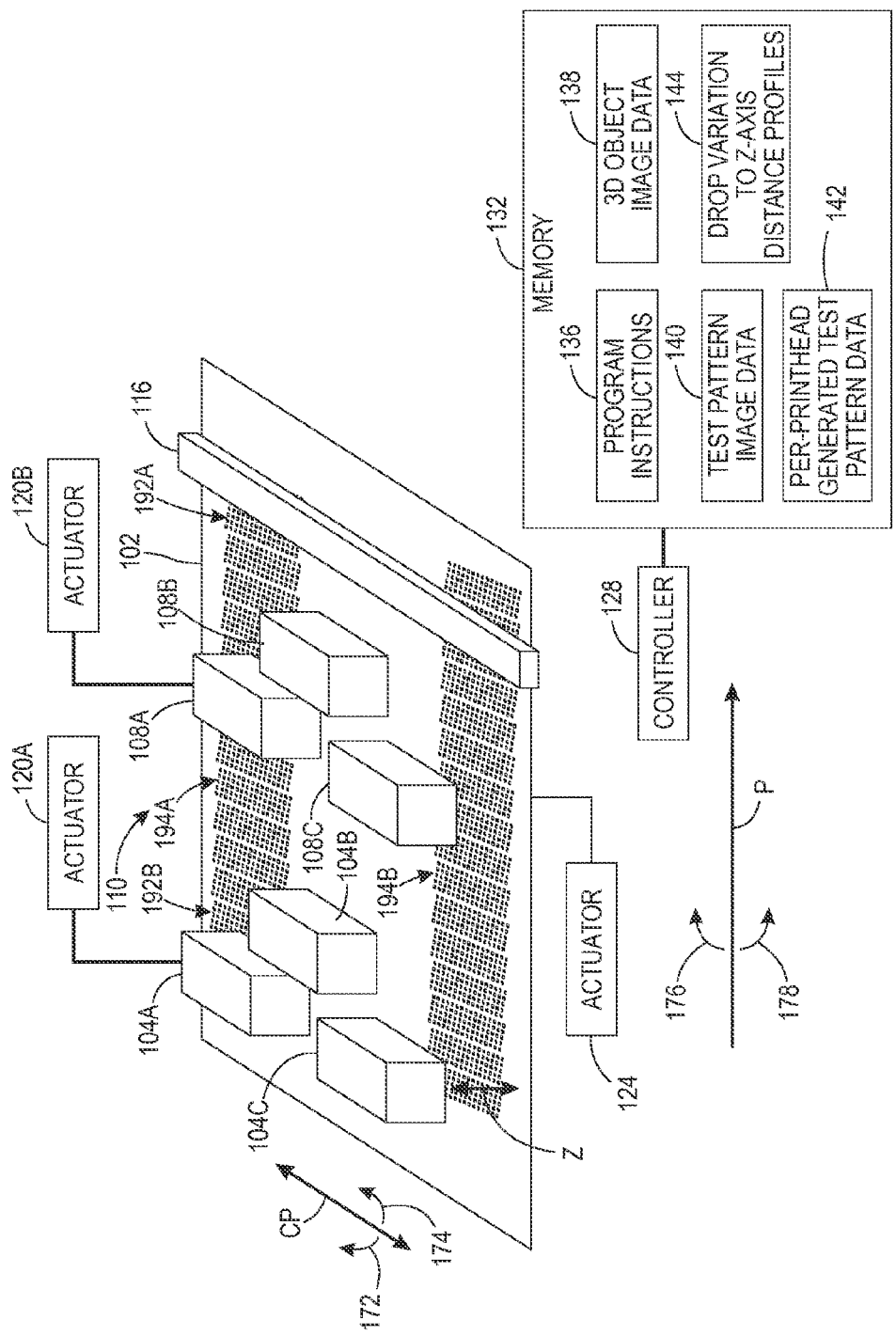
FIG. 1A is a diagram of a three-dimensional object printer.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in one or more printheads and subsequently hardened into a solid material that forms an object through an additive three-dimensional object printing process. In some three-dimensional object printer embodiments, multiple forms of build material are used to produce an object. In some embodiments, different build materials with varying physical or chemical characteristics form a single object. In other embodiments, the printer is configured to eject drops of a single type of build material that incorporates different colors through dyes or other colorants that are included in the build material. The three-dimensional object printer controls the ejection of drops of build materials with different colors to form objects with varying colors and optionally with printed text, graphics, or other single and multi-color patterns on the surface of the object.

As used herein, the term "support material" refers to another material that is ejected from printheads during a three-dimensional object printing process to stabilize the object that is formed from the build materials. For example, as the three-dimensional object printer applies layers of the build material to form the object, at least one printhead in the printer also ejects layers of the support material that engage portions of the object. The support material holds one or more sections of the build material in place before the object constructed with the build material is a complete object and supported because it is a single object. A simple example of the use of support material includes construction of a cane using the three-dimensional object printer. The arched part of the cane is at the top of the object, and the support material provides support for the downward pointing part of the handle prior to completion of the top of the arch in the cane. The support material also prevents newly formed features from breaking before sufficient build material is present to hold the object together, and prevents portions of the build material that have not fully solidified from flowing out of position before the hardening process is completed. Examples of support material include, but are not limited to, waxy materials that provide support to the object during the printing process and that can be easily removed from the object after the printing process is completed.

As used herein, the term "process direction" refers to a direction of movement of a support member past one or more printheads during a three-dimensional object formation process. The support member holds the three-dimensional object and accompanying support material and building material during the print process. In some embodiments, the support member is a planar member such as a metal plate, while in other embodiments the support member is a rotating cylindrical member or a member with another shape that supports the formation of an object during the three-dimensional object printing process. In some embodiments, the printheads remain stationary while the support member and object moves past the printhead. In other embodiments, the printheads move while the support member remains stationary. In still other embodiments, both the printheads and the support member move.

As used herein, the term "cross-process direction" refers to a direction that is perpendicular to the process direction and in the plane of the support member. The ejectors in two or more printheads are registered in the cross-process direction to enable an array of printheads to form printed patterns of build material and support material over a two-dimensional planar region. During a three-dimensional object printing process, successive layers of build material and support material that are formed from the registered printheads form a three-dimensional object.

As used herein, the term "z-axis" refers to an axis that is perpendicular to the process direction, the cross-process direction, and to the plane of the support member in a three-dimensional object printer. At the beginning of the three-dimensional object printing process, a separation along the z-axis refers to a distance of separation between the support member and the printheads that form the layers of build material and support material. As the ejectors in the printheads form each layer of build material and support material, the printer adjusts the z-axis separation between the printheads and the uppermost layer to maintain a substantially constant distance between the printheads and the uppermost layer of the object during the printing operation. Many three-dimensional object printer embodiments maintain the z-axis separation between the printheads and the uppermost layer of printed material within comparatively narrow tolerances to enable consistent placement and control of the ejected drops of build material and support material. In some embodiments, the support member moves away from the printheads during the printing operation to maintain the z-axis separation, while in other embodiments the printheads move away from the partially printed object and support member to maintain the z-axis separation.

As used herein, the term "variation" used in conjunction with printed test patterns refers to any statistical measurement corresponding to a difference between the relative cross-process direction locations of printed marks in a printed test pattern from a printhead in the printer compared to a predetermined arrangement of the printed marks. As used herein, the term "mark" refers to a printed pattern of one or more drops that are formed by a single ejector in a printhead and arranged the process direction axis. A test pattern is formed from an arrangement of marks using multiple ejectors in the printhead. For example, a test pattern includes one or more rows of printed marks that are formed with predetermined cross-process direction distances between adjacent marks in each row. A printhead with ejectors that eject drops of the material in parallel with the z-axis forms the predetermined test pattern with no variation or minimal variation. However, the practical embodiments of printheads in the printer include at least some ejectors that eject drops of material at an angle that produces differences between the cross-process direction distances of the printed marks in the test pattern in comparison to the expected cross-process distances. As described in more detail below, the printer identifies the z-axis distance between different printheads and a substrate in the printer with reference to an identified level of variation in the cross-process direction locations of printed marks in test patterns.

Non-limiting examples of variation statistics for marks that are printed in the test pattern include the standard deviation, variance, mean absolute deviation, range, interquartile range, and the like. For example, a predetermined test pattern includes multiple rows of printed marks that are formed with uniform cross-process direction distances between adjacent marks in each row. As described in more detail below, the printer performs an optimization process to generate a test pattern that includes a high level of variation between printed marks based on the characteristics of the ejectors in a printhead. The printer identifies the z-axis distance between one or more printheads and a substrate in the printer with reference to an identified level of variation in the cross-process direction locations of the printed marks in the generated test pattern.

Figure 1B:
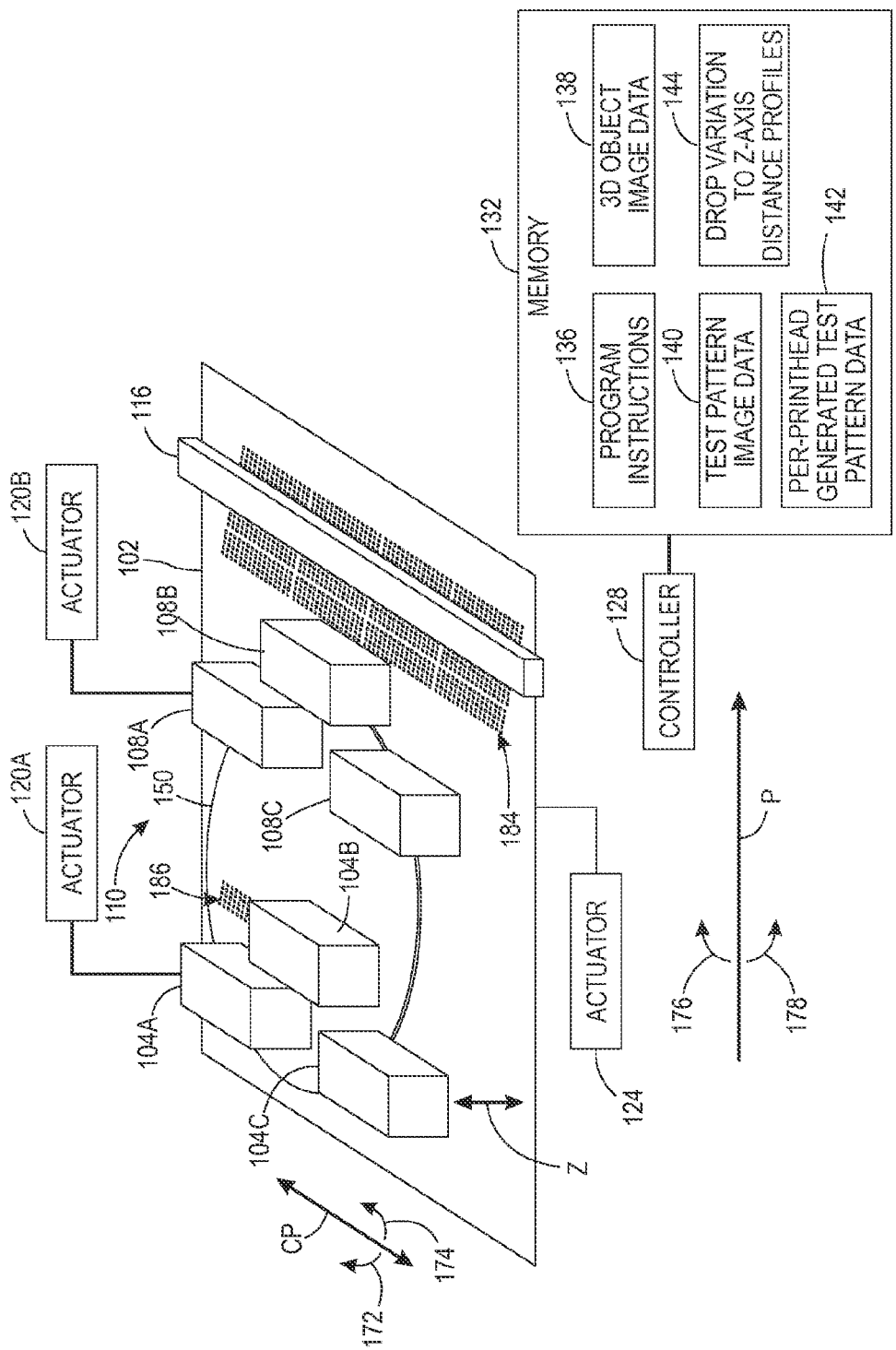
FIG. 1B is a diagram of the three-dimensional object printer of FIG. 1A during an object printing operation.

FIG. 1A and FIG. 1B depict a three-dimensional object printer 100 that is configured to identify the z-axis distance between one or more printheads and a substrate in the printer 100. The printer 100 includes a support member 102, a first printhead array including printheads 104A-104C, a second printhead array including printheads 108A-108C, printhead array actuators 120A and 120B, support member actuator 124, an image sensor 116, a controller 128, and a memory 132. In one configuration, the printhead arrays 104A-104C and 108A-108C emit two different types of build material to form three-dimensional printed objects with two different types of build material. In another configuration, one printhead array emits a build material and the other printhead array emits a support material to form three-dimensional printed objects. Alternative printer embodiments include a different number of printhead arrays or a different number of printheads in each printhead array.

In the printer 100, the support member 102 is a planar member, such as a metal plate, that moves in a process direction P. The printhead arrays 104A-104C and 108A-108C and image sensor 116 form a print zone 110. The support member 102 carries any previously formed layers of the support material and build material through the print zone 110 in the process direction P. During the printing operation, the support member 102 moves in a predetermined process direction path P that passes the printheads multiple times to form successive layers of a three-dimensional printed object, such as the object 150 that is depicted in FIG. 1B. The printheads 104A-104C and 108A-108C also eject drops of material to form test patterns, such as the test patterns 192A-192B and 194A-194B depicted in FIG. 1A and the test patterns 184 and 186 depicted in FIG. 1B. In some embodiments, multiple members similar to the member 102 pass the print zone 110 in a carousel or similar configuration. In the printer 100, one or more actuators move the member 102 through the print zone 110 in the process direction P. In other embodiments, the actuators 120A and 120B or other actuators move the printheads 104A-104C and 108A-108C, respectively, along the process direction P to form the printed object on the support member 102.

In the printer 100, an actuator 124 also moves the support member 102 along the z-direction axis (z) away from the printheads in the print zone 110 after application of each layer of material to the support member. In some embodiments, the actuator 124 or other actuators that are operatively connected to the support member 102 are configured to adjust an angle of tilt of the support member 102 about the cross-process direction axis CP (tilt arrows 172 and 174) and the process direction axis P (tilt arrows 176 and 178). In another configuration, the actuators 120A and 120B move the printhead arrays 104A-104C and 108A-108C, respectively, upwards along the z-axis to maintain the separation between the printheads and a printed object. In the printer 100, the actuators 124 and 120A-120B are electromechanical actuators such as stepper motors that receive control signals from the controller 128 to move the support member 102 or printhead arrays 104A-104C and 108A-108C by predetermined distances along the z-axis. The illustrative embodiment of the printer 100 includes actuators that adjust the z-axis positions of both the support member 102 and the printhead arrays 104A-104C and 108A-108C, but alternative printer embodiments include actuators operatively connected to only the support member 102 or only to the printheads. The print zone 110 forms an additional layer to the three-dimensional printed object or objects on each member during each circuit through the path to form multiple sets of three-dimensional objects in parallel.

The printhead arrays including the printheads 104A-104C and 108A-108C that eject material toward the support member 102 to form layers of a three-dimensional printed object, such as the object 150 that is depicted in FIG. 1B. Each of the printheads 104A-104C and 108A-108C includes a plurality of ejectors that eject liquefied drops of a build material or support material. In one embodiment, each ejector includes a fluid pressure chamber that receives the liquid build material, an actuator such as a piezoelectric actuator, and an outlet nozzle. The piezoelectric actuator deforms in response to an electric firing signal and urges the liquefied build material through the nozzle to eject a drop of the build material toward the member 102. If the member 102 bears previously formed layers of a three-dimensional object, then the ejected drops of the build material form an additional layer of the object. Each of the printheads 104A-104C and 108A-108C includes a two-dimensional array of the ejectors, with an exemplary printhead embodiment including 880 ejectors. During operation, the controller 128 controls the generation of the electrical firing signals to operate selected ejectors at different times to form each layer of the build material for the object. As described in more detail below, the controller 128 also generates firing signals for the ejectors in the printheads 104A-104C and 108A-108C to print test patterns that the printer 100 uses to identify a distance along the z-axis between each printhead and a substrate in the print zone 110. The substrate can be the surface of the support member 102 or an upper layer of a three-dimensional printed substrate formed on the support member 102.

While FIG. 1A and FIG. 1B depict two printhead arrays that eject drops of the build material, alternative embodiments can include three or more printhead arrays that form printed objects with additional build materials. Another embodiment includes only a single printhead array. While the printhead arrays 104A-104C, 108A-108C are each depicted as including three printheads, alternative configurations can include few printheads or a greater number of printheads to accommodate print zones with different sizes in the cross-process direction. Additionally, in rasterized three-dimensional object printer embodiments, one or more printheads move along the cross-process direction axis CP and optionally the process direction axis P during printing operations.

The image sensor 116 includes an array of photodetectors that is arranged across the print zone 110 in the cross-process direction CP is configured to generate digitized image data that corresponds to light reflected from the build material and support material that is formed on the member 102. In one embodiment, the photodetectors generate gray scale 8-bit image data with a total of 256 (0 to 255) levels that correspond to a level of reflected light that each photodetector receiver from the top-most layer of printed support material and printed build material. In other embodiments, the image sensor 116 incorporates multispectral photodetector elements such as red, green, blue (RGB) sensor elements. During operation, the image sensor 116 generates multiple image scanlines that correspond to printed patterns of material drops including printed test patterns formed on the support member 102 or on a substrate that is formed from layers of build material or support material. As the support member 102 moves past the image sensor 116, the image sensor 116 generates two-dimensional generated image data from a series of the scanlines. The controller 128 receives the generated image data and performs further processing of the generated image data to identify the z-axis direction distances between the printheads and the substrate with reference to generated image data of printed test patterns.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to the actuator 124 that controls the movement of the support member 102 and the actuators 120A and 120B that control the z-axis movement of the printhead arrays 104A-104C and 108A-108C. The controller 128 is also operatively connected to the printhead arrays 104A-104C and 108A-108C, the image sensor 116, and a memory 132.

In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores programmed instructions 136, 3D object image data 138, predetermined test pattern data 140, per-printhead generated test pattern data 142, and a drop variation to z-axis distance profile 144 associated with each of the printheads 104A-104C and 108A-108C. The controller 128 executes the stored program instructions 136 to operate the components in the printer 100 to both form a three-dimensional printed object, such as the object 150 and to print test patterns that identify z-axis direction distances between the printheads and a substrate in the print zone 110. The controller 128 also generates the drop variation to z-axis distance profiles for the printheads 104A-104C and 108A-108C as described in more detail below in the process 400. In some configurations, the controller 128 also identifies an angle of tilt away from the z-axis of the surface of the support member 102 or another substrate in the print zone 110. The 3D object image data 138 include, for example, a plurality of two-dimensional image data patterns that correspond to each layer of build material and support material that the printer 100 forms during the three-dimensional object printing process. The controller 128 ejects drops of material from the printheads 104A-104C and 108A-108C with reference to each set of two-dimensional image data to form each layer of the object 150.

The memory 132 also stores test pattern data 140 that correspond to predetermined patterns of marks that the ejectors in the printheads 104A-104C and 108A-108C form on substrates in the print zone 110. As described in more detail below, the printer 100 forms the predetermined test patterns based on the stored test pattern data 140 to generate additional test patterns on a per-printhead basis. The printer 100 generates a second test pattern for each of the printheads 104A-104C and 108A-108C that is formed from only a portion of the ejectors in the printhead to increase the level of variation in the cross-process direction marks formed in the second test pattern. The controller 128 stores the generated second test pattern for each printhead with the per-printhead test pattern data 142 in the memory 132.

FIG. 1B depicts the printer 100 during a three-dimensional object printing operation. In FIG. 1B, the printheads 104A-104C and 108A-108C form a three-dimensional printed object 150. The support member 102 includes a margin region that is configured to receive additional printed test patterns 184 from some or all of the printheads 104A-104C and 108A-108C. In the embodiment of FIG. 1B, the upper surface of the printed object 150 also serves as a substrate that receives a printed test pattern 186 from the printhead 104A. The image sensor 116 generates image data that include discernible printed marks in the test pattern 186 when the uppermost layer or layers of the object 150 is formed from an optically distinct material, such as a build material with a different color or support material that is ejected from the printheads 108A-108C. In other configurations, the printheads 104A-104C and 108A-108C form structures from two different build materials or a build material and support material to form substrate structures that receives printed test patterns and that have a z-axis height that is similar to the height of the object 150. The controller 128 uses the substrate structures to identify the z-axis distance between one or more of the printheads and the uppermost layer of the object 150.

Figure 2:
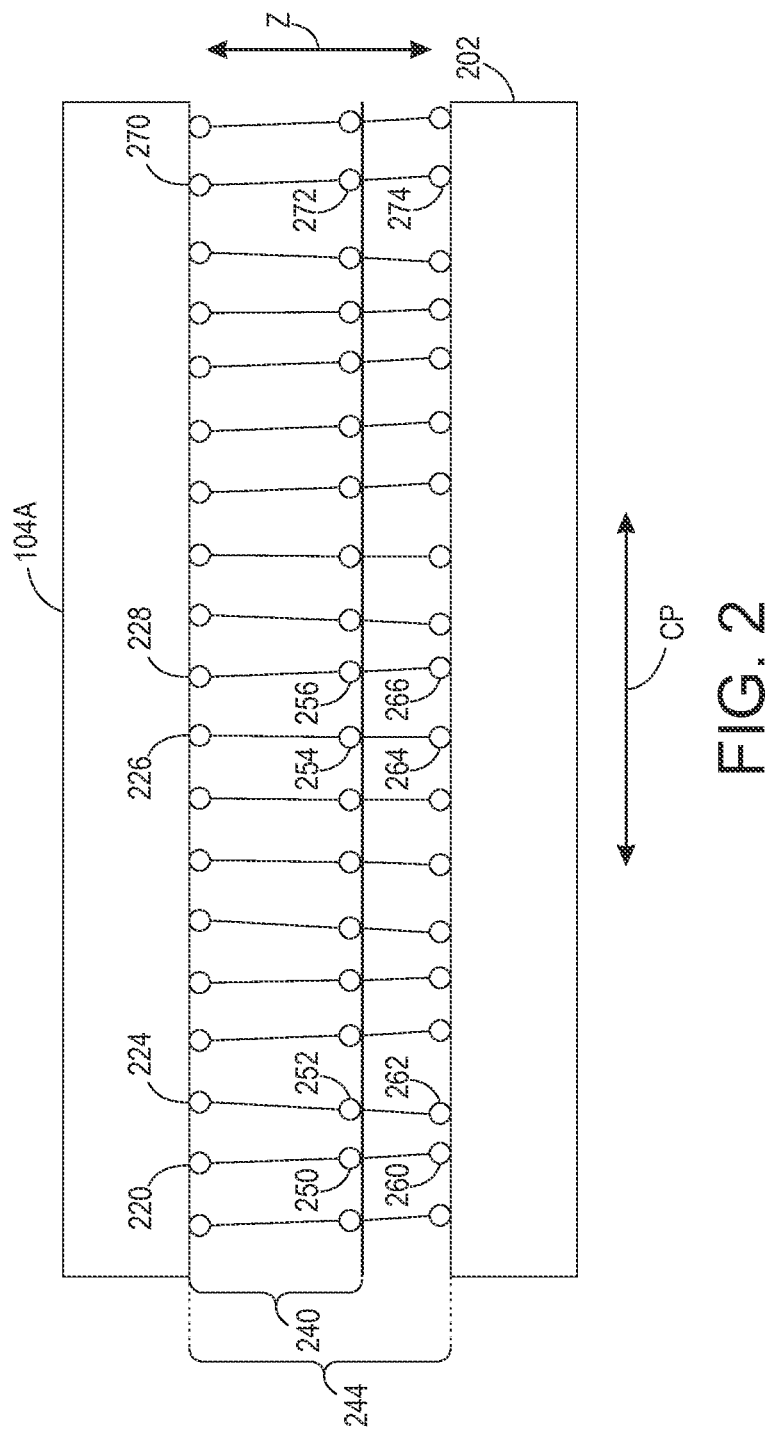
FIG. 2 is a diagram depicting an illustrative distribution of drops that are ejected from a printhead onto a substrate at different z-axis distances between the printhead and substrate.

FIG. 2 depicts the printhead 104A and the substrate 202 in a first z-axis direction position 240 and a second z-axis position 244. As described above, the substrate 202 can be the surface of the support member 102 or upper surface of a printed structure that is formed on the support member 102. In the illustrative example of FIG. 2 the first z-axis direction position 240 places the printhead 104A and substrate 202 closer together along the z-axis compared to the second position 244, but the in another configuration the first position places the printhead 104A and substrate 202 at a larger z-axis distance than the second position. In the configuration of FIG. 2, the controller 128 operates the actuator 124 to move the substrate along the z-axis between the first position 240 and second position 244, while in other embodiments the actuator 120A moves the printhead 104A or the actuators 124 and 120A move both the substrate 202 and printhead 104A, respectively, along the z-axis.

The printhead 104A includes a plurality of ejectors that are arranged along the cross-process direction axis CP. In some embodiments, the printhead 104A includes diagonal arrangements of ejectors that are staggered across the face of the printhead 104A in a two-dimensional arrangement. As described above, the controller 128 only operates a portion of the ejectors in the printhead 104 to form a single set of marks in a row set of the test pattern. FIG. 2 depicts only a subset of ejectors in the printhead 104A that eject the drops to form a single row set and the printhead 104A includes four ejectors separating each of the adjacent activated ejectors in the cross-process direction CP to form the test patterns 600 and 675 of FIG. 6. For example, in FIG. 2 the ejectors 220 and 224 form adjacent marks in one row of a printed test pattern but four additional ejectors separate the ejectors 220 and 224 in the cross-process direction. The controller 128 operates the intermediate ejectors to form other row sets in the predetermined test pattern 600. In different test pattern configurations, the controller 128 operates ejectors to form marks in a single row set with at least one ejector positioned between the activated ejectors in the cross-process direction.

As depicted in FIG. 2, the level of variation between the locations of printed material drops and marks on the substrate surface 202 increases as the z-axis distance between the printhead 104A and the substrate 202 increases. In the embodiment of FIG. 2, the material drops travel along relatively linear paths after emission from the ejectors in the printhead 104A. Due to manufacturing variations in the printhead 104A, at least some of the ejectors emit the material drops with an angle in the cross-process direction, and the material drops do not follow a path that is parallel to the z-axis to reach the substrate 202. For example, the ejectors 220, 224, 226, and 228 emit material drops at an angle that is not parallel to the z-axis.

As depicted in FIG. 2, the level of variation between the cross-process direction locations of the drops of material ejected from the printhead 104A increases as the z-axis distance between the printhead 104A and the substrate 202 increases. In practical operation, the ejected material drops travel along substantially linear paths between the printhead 104A and the substrate 202. Thus, the degree of drop position variation along the cross-process direction axis CP for material drops from a given ejector increases as the z-axis direction distance between the printhead 104A and the substrate 202 increases. In the first position 240, the drops 250 and 252 that are emitted from the ejectors 220 and 224, respectively, land on positions that are closer together in the cross-process direction than the nominal cross-process direction distance between adjacent printed marks when both ejectors emit material drops in parallel with the z-axis. Other ejectors, such as the ejectors 226 and 228 emit the material drops 254 and 256, respectively, which land farther apart in the cross-process direction axis than the nominal cross-process direction separation between adjacent printed marks when both ejectors emit material drops in parallel with the z-axis. In the second position 244, the same types of variation in cross-process direction drop placement occur, but the degree of variation increases due to the longer z-axis distance between the printhead 104A and the substrate 202. For example, the material drops 260 and 262 are closer together than the corresponding drops 250 and 252 in the first position 240, while the material drops 264 and 266 are farther apart than the corresponding drops 254 and 256 in the first position 240.

As depicted in FIG. 2, the ejectors in the printhead 104A exhibit varying degrees of offset in the cross-process direction for ejected material drops. The cross-process direction offsets are produced as a result of small variances in the manufacture of the printhead 104A. Different printheads with the same configuration as the printhead 104A, such as the printheads 104B-104C and 106A-106C in the printer 100, also exhibit variations in the cross-process direction offsets for different ejectors, although the precise degree and direction of offsets between ejectors varies from printhead to printhead. In many printheads, some of the ejectors have little or no cross-process direction offset when ejecting material. For example, in FIG. 2 the ejector 270 ejects a material drop that along a path that is nearly parallel to the z-axis. The ejector 270 emits material drops in the cross-process direction locations 272 and 274 for the substrate 202 in positions 240 and 244, respectively. As depicted in FIG. 2, the cross-process direction locations 272 and 274 have very little separation along the cross-process direction axis CP. Thus, generated image data of printed marks that the ejector 270 forms on the substrate 202 depict little or no change over different z-axis distances between the printhead 104A and the substrate 202.

While the ejector 270 is useful in ejecting material to form a three-dimensional printed object or support material structure with minimal cross-process direction offset during a printing operation, the printed marks 272 and 274 do little to enable the printer 100 to identify a z-axis distance between the printhead 104A and the substrate 202. As described below, the printer 100 generates test patterns for one or more printheads, such as the printhead 104A, where at least one ejector that ejects material with little or no cross-process direction offset does not form marks in the generated test pattern. Instead, the printer 100 forms the printed test pattern using a portion of the ejectors in the printhead that either maximize the total cross-process direction offset in a test pattern. Thus, some ejectors, such as the ejectors 220-228, form marks in the printed test pattern while other ejectors with little or no cross-process direction offset, such as the ejector 270, do not form marks in the generated test pattern.

Figure 3:
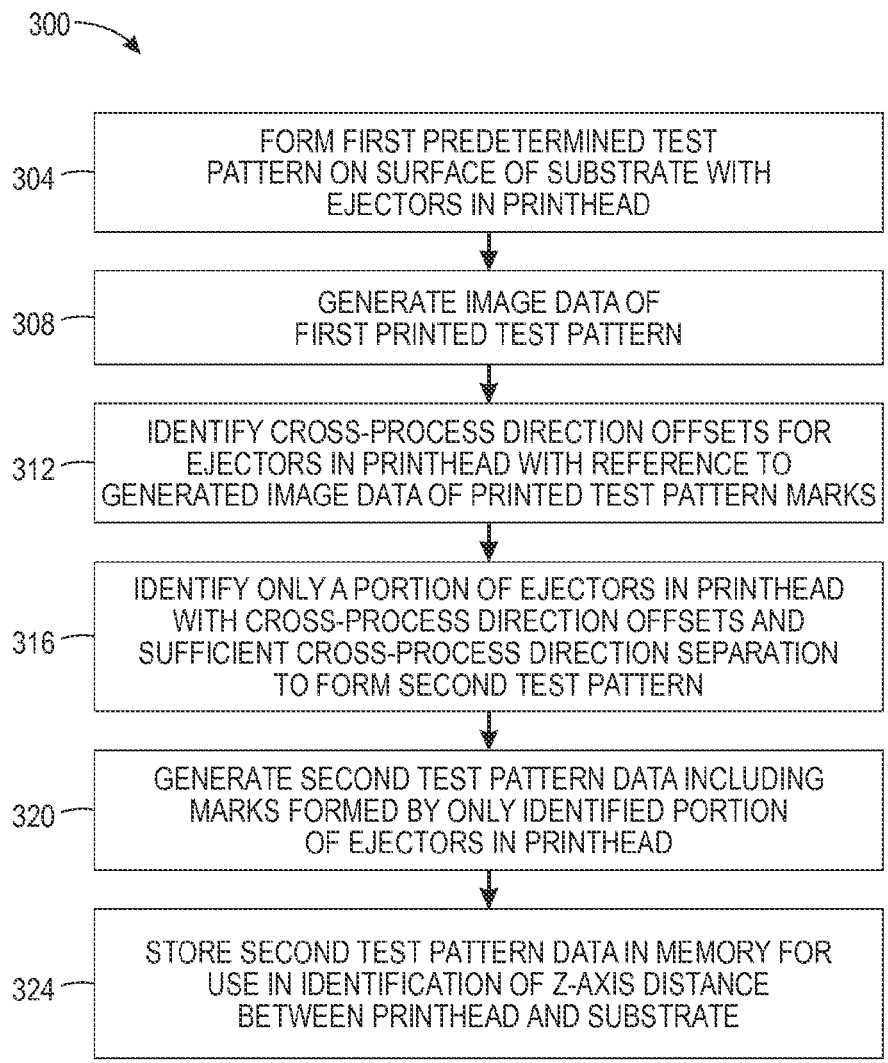
FIG. 3 is a block diagram of a process for generation of test pattern data in a printhead where the generated test pattern includes marks that are formed by only a portion of the ejectors in the printhead.

FIG. 3 depicts a block diagram of a process 300 for generation of a test pattern that includes marks formed from only a portion of the ejectors in a printhead. In particular, the process 300 forms the test pattern without a mark formed by at least one ejector in the printhead that prints marks with a cross-process direction offset that is less than another identified cross-process direction offset of at least one ejector in the portion of the ejectors that are included in the test pattern. In the description below, a reference to the process 300 performing an action or function refers to the operation of a controller in a printer to execute stored program instructions to perform the function or action with other components in the printer. The process 300 is described in conjunction with the printer 100 and FIG. 1A-FIG. 1B, FIG. 2, and FIG. 6 for illustrative purposes.

Process 300 begins as the printer 100 operates the ejectors in a printhead to form a first predetermined test pattern on the surface of the substrate using the ejectors in a printhead (block 304). For example, in the printer 100 the controller 128 generates firing signals for the ejectors in the printhead 104A to eject material drops in a predetermined test pattern with reference to the predetermined test pattern data 140. In the printer 100 the substrate is either the surface of the support member 102 or a surface of a 3D printed object, such as the object 150, that is formed from a build material or support material that is optically distinct from the material ejected from the printhead 104A. The image sensor 116 in the printer 100 generates image data of the printed test pattern on the substrate and the controller 128 receives the generated image data from the image sensor 116 (block 308).

Figure 6:
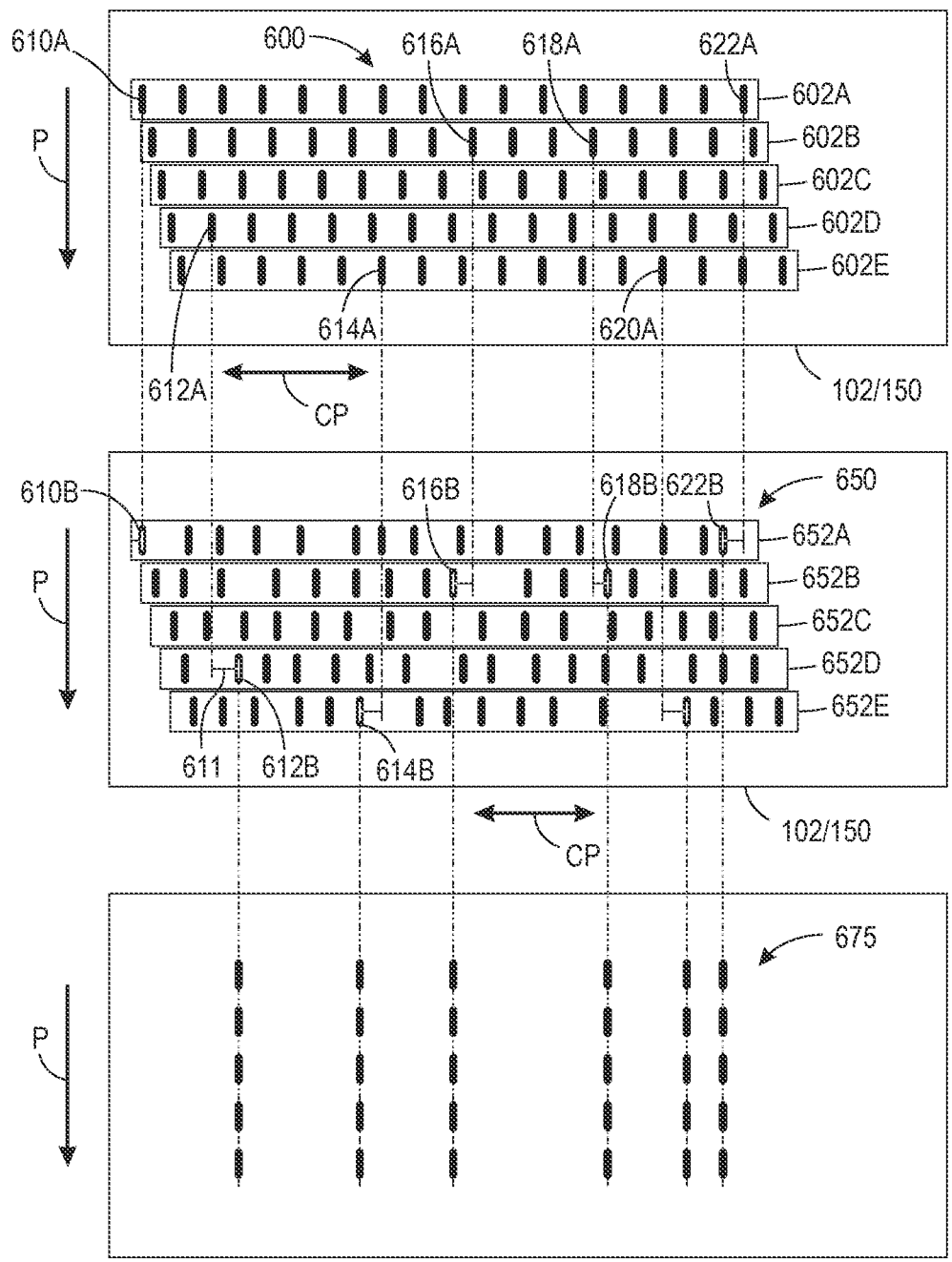
FIG. 6 is an illustrative example of a first predetermined test pattern that includes printed marks formed in a cross-process direction and a second test pattern having a second plurality of marks formed by only a portion of the ejectors in a printhead that form the predetermined test pattern.

In the process 300, the first predetermined test pattern includes a plurality of marks that most or all of the operational ejectors in the printhead 104A form on the support member 102. FIG. 6 depicts an example of a predetermined test pattern 600. The predetermined test pattern 600 includes a plurality of printed marks that are arranged along the cross-process direction axis CP. A single ejector in a printhead, such as the printhead 104A, ejects one or more drops of material to form each printed mark in the test pattern 600. The predetermined test pattern 600 includes five row sets 602A, 602B, 602C, 602D, and 602E. As used herein, the term "row set" refers to a plurality of printed marks that are formed on the surface of the substrate in a predetermined arrangement extending in the cross-process direction. A row set includes at least one set of the printed marks arranged in a single "row" along the cross-process direction, although some test patterns include row sets with multiple rows of the printed marks that are formed as a set of rows that are arranged along the process direction. The printer 100 forms multiple printed rows in some row sets to reduce the effects of random cross-process material drop placement errors during identification of the variation in the cross-process direction locations of marks in the printed test pattern.

In FIG. 6, the printed test pattern 600 includes a single row of printed marks in each of the row sets 602A-602E, with each row set including printed marks that are arranged along the cross-process direction axis CP. The controller 128 operates only a portion of the ejectors in the printhead to form each row set in the test pattern. The test pattern 600 includes five row sets because the controller 128 forms adjacent marks in each row set using a set of ejectors in the printhead 104A where four intermediate ejectors lie between each pair of ejectors that form adjacent marks in the row set. The predetermined test pattern 600 includes five total row sets to operate each of the ejectors in the printhead 104 to form a printed mark in one of the row sets. In some embodiments, the controller 128 forms a test pattern that includes multiple instances of the test pattern 600 or another similar test pattern in different regions of the substrate surface. In other test pattern embodiments, the row sets include multiple rows of the printed marks. For example, in some embodiments each row set includes a series of two or more rows of the printed marks formed by a single portion of the ejectors in the printhead 104A. The controller 128 forms the printed test pattern with multiple rows in each row set to reduce the effects of random drop placement errors in the identification of variations between the locations of printed marks in the cross-process direction.

As depicted in FIG. 6, the test pattern 600 depicts an idealized arrangement of printed marks where the cross-process direction distance between adjacent marks is uniform for each of the selected marks row sets 602A-602E. However, as depicted above in FIG. 2, some of the ejectors in the printhead 104A emit drops of material along a path that is not parallel to the z-axis, which produces cross-process direction offsets in the locations of the printed marks on the surface of the substrate. In FIG. 6, the printed test pattern 650 depicts an example of generated image data that includes marks formed by a printhead that includes ejectors that emit material drops with cross-process direction offsets. Since at least some of the ejectors in the printhead 104A eject material drops at varying angles along the cross-process direction other than the z-axis, the cross-process distances between adjacent printed marks in the row sets 652A-652E in the test pattern 650 exhibit variations compared to the test pattern 600.

Referring again to FIG. 3, process 300 continues as the controller 128 identifies the cross-process direction offsets for the marks in the generated image data of the first printed test pattern (block 312). As used herein, the term "cross-process direction offset" refers to a cross-process direction distance between a location of a printed mark that the controller 128 identifies in the generated image data of the printed test pattern and the corresponding location of the mark in the test pattern data of the predetermined test pattern. For example, in FIG. 6 the cross-process direction offset 611 separates the nominal location of a mark 612A in the test pattern 600 from the actual location of the corresponding printed mark 612B. The controller 128 identifies the cross-process direction offsets between each of the marks in the predetermined test pattern 600 and the corresponding locations of marks in the printed test pattern 650. In one embodiment, the controller 128 performs filtering and convolutions with edge or center detection kernels of the generated image data corresponding to entire rows of the printed marks in the printed test pattern to identify the cross-process direction locations and corresponding cross-process direction offsets of printed marks for different ejectors in the printhead.

The z-axis offset depends on the variation of the cross-process direction offsets. The most accurate measurement is made when the cross-process direction of every jet is determined. However, measuring every jet on the printhead requires multiple row sets. Some embodiments approximate the variation of the cross-process direction offset with a single row set, such as in configurations where the substrate includes a limited amount of space to receive the printed test pattern. Some configurations that print a test pattern using a single row set are used with a substrate, such as the support member 102, that receives the printed test pattern at different times and different locations during a three-dimensional object printing process. A printed test pattern that includes a single row or a small number of rows covers a smaller portion of the substrate, which enables the printer 100 to form a larger number of the test patterns during the printing process without cleaning the previously printed test patterns from the substrate surface.

Process 300 continues as the printer 100 identifies only a portion of the ejectors in the printhead 104A that include cross-process direction offsets and sufficient separation in the cross-process direction to form a second printed test pattern with a single row set (block 316). While the predetermined test pattern typically includes marks that are formed by most or all of the ejectors in the printhead using a uniform pattern, the second printed test pattern only includes marks that are formed by a portion of the ejectors in the printhead. The controller 128 identifies the portion of the ejectors that form the second test pattern without at least one ejector in the printhead that forms a mark in the first test pattern does not form a mark in the second test pattern. The controller 128 omits at least one ejector in the printhead 104A with an identified cross-process direction offset that is less than the cross-process direction offset of at least one other ejector that is present in the portion of the ejectors that form the second test pattern. The controller 128 omits a minimum of K jets between any two adjacent jets in the second test pattern.

In one embodiment of the process 300, the controller 128 identifies the portion of the ejectors in the printhead 104A that are included in the second test pattern using a dynamic programming process that identifies ejectors with a maximum sum of cross-process direction offsets while maintaining a minimum cross-process direction separation between the identified ejectors. In the process 300, the controller 128 identifies ejectors that form the printed marks having the greatest total sum of cross-process direction offsets for the second printed test pattern. However, the controller 128 identifies the ejectors with reference to a constraint for a minimum cross-process direction separation between the identified ejectors. For example, the printhead 104A forms adjacent marks in each of the row sets 652A-652E in the predetermined test pattern with a separation in the cross-process direction of four ejectors in the printhead 104A between each pair of ejectors that form adjacent marks in the row sets 652A-652E. The controller 128 identifies the ejectors in the printhead 104A that have the maximum cross-process direction offset while satisfying a minimum separation constraint of a predetermined number of ejectors separating adjacent ejectors that form marks in the second test pattern. The controller 128 implements a variation of a maximum sum subsequence with non-consecutive elements. The general maximum sum subsequence with non-consecutive elements dynamic programming process is known to the art. In the printer 100, the controller 128 implements a variation of the dynamic programming process that is referred to as a "max sum min gap" process. The controller 128 executes the stored program instructions 136 to identify ejectors having the greatest sum of cross-process direction offsets (max sum) and satisfy an ejector separation constraint that minimizes the cross-process direction gap between ejectors (min gap). In other embodiments, the controller 128 implements any suitable algorithm to identify the portion of ejectors in the printhead for the second test pattern.

A simplified example of the max sum min gap algorithm includes a printhead having nine ejectors with measured cross-process direction offsets of [10,9,8,15,2,5,4,13,6]μm, and a constraint that at least two ejector should separate adjacent ejectors that are selected for the second test pattern. The sequence of cross-process direction offsets corresponds to the cross-process direction locations of the ejectors in the printhead. A naïve approach that selects a total of three equally spaced ejectors ([10,18,4], [9,2,13], or [8,5,6]) produces cross-process directions sums of either 29 μm, 27 μm, or 19 μm, respectively. The dynamic programming process, however, identifies a set of three four ejectors ([10,15, 13]) that produce a greater total cross-process direction sum of 38 μm while meeting the constraint that at least two ejector be placed between the portion of ejectors in the second test pattern. The dynamic programming process omits one or more of the ejectors that have comparatively low cross-process direction offsets, such the ejector with a 2 μm cross-process direction offset, from the second test pattern. In the printer 100, the controller 128 performs stored program instructions to implement the max sum min gap dynamic programming process to identify ejectors having the greatest sum of cross-process direction offsets (max sum) and satisfy an ejector separation constraint that minimizes the cross-process direction gap between ejectors (min gap). The max sum min gap algorithm is set forth in the following equation: $T[i]=\max\{T[i-s], T[i-s+1], \ldots, T[i-1], T[i-s-1]+a[i]\}$ where $a[i]$ is the cross process offset of ejector with index I and $T[i]$ is the maximum sum of a subsequence (s) of the identified cross-process direction offset values numbers having indices in a range of 1 to i that satisfy the max sum min gap algorithm. The controller 128 uses dynamic programming rule for $T[i]$ to identify the portion of the ejectors in the printhead with the maximum sum of cross-process direction offsets.

In the above example, the controller 128 initializes the dynamic program process with the condition $T[-2]=0$, $T[-1]=0$, and $T[0]=0$. The controller 128 then performs the functions corresponding to the following equations for the illustrative example of the max sum min gap algorithm:

$$T[1]=\max\{T[-1],T[0],T[1-3]+a[1]\}=\max\{0,0,0+10\}=10$$

$$T[2]=\max\{T[0],T[1],T[2-3]+a[2]\}=\max\{0,10,0+9\}=10$$

$$T[3]=\max\{T[1],T[2],T[3-3]+a[3]\}=\max\{10,10,0+8\}=10$$

$$T[4]=\max\{T[2],T[3],T[4-3]+a[4]\}=\max\{10,10,10+15\}=25$$

$$T[5]=\max\{T[3],T[4],T[5-3]+a[5]\}=\max\{10,25,10+2\}=25$$

$$T[6]=\max\{T[4],T[5],T[6-3]+a[6]\}=\max\{25,25,10+5\}=25$$

$$T[7]=\max\{T[5],T[6],T[7-3]+a[7]\}=\max\{25,25,25+4\}=29$$

$$T[8]=\max\{T[6],T[7],T[8-3]+a[8]\}=\max\{25,29,25+13\}=38$$

$$T[9]=\max\{T[7],T[8],T[9-3]+a[9]\}=\max\{29,38,25+3\}=38$$

The controller 128 computes the equation T[9] to produce a max sum min gap value of 38, which can be seen as correct from examination of the example presented above. For a larger set of jets, this algorithm will produce the largest sum of the ejector offsets that meet the criteria of a minimum separation between ejectors.

The exact ejectors that produce the maximum sum can be identified through the use of backpointers. The controller 128, saves the maximum of the sequence of terms described above and a sequence of the terms that generated the maximum in the memory 132 to generate the backpointers. For example, the maximum of the terms that generate T[8] is the last of the sequence, which arises from T[5]. The controller 128 generates a backpointer from ejector 8 that references ejector 5. The maximum of the terms that generate T[9] is the middle term, which is T[8]. Therefore, the controller 128 generates a backpointer from ejector 9 that references ejector 8. To reconstruct the sequence, the controller 128 starts with the last ejector in the sequence and follows a sequence of backpointers to identify the remaining ejectors in the sequence. If the backpointer of one ejector refers to an adjacent ejector (e.g. backpointer from ejector 4 refers to ejector 3), then the adjacent ejector replaces the current ejector in the selected sequence of ejectors. If the backpointer does not refer an adjacent ejector, then the controller 128 adds the current ejector to the list of ejectors to use to reconstruct the controller 128 continues the backpointer generation process with the next ejector that is referenced from the current ejector. The controller 128 repeats the backpointer process until reaching the lowest ejector in the printhead or group of ejectors that form the test pattern.

During process 300, the controller 128 generates second test pattern data including marks that are formed using the portion of the ejectors identified above and without using at least one other ejector in the printhead (block 320). The controller 128 stores the second test pattern data with the per-printhead test pattern data 142 in the memory 132 in association with the printhead 104A (block 324). The second test pattern data include any data that the controller 128 uses to operate the printhead 104A to form a second test pattern that only has printed marks formed by the identified portion of the ejectors and without marks formed by the remaining ejectors in the printhead. In one embodiment, the controller 128 generates a rasterized printed image for the second test pattern data including at least one mark formed by each of the ejectors in the identified portion of ejectors for the printhead 104A.

FIG. 6 depicts an illustrative example of a plurality of marks that are formed in a second test pattern 675. In FIG. 6, the second test pattern 675 includes multiple printed rows of the marks in a row set using ejectors determined from the max sum min gap algorithm. The image sensor 116 generates image data of the multiple mark rows to enable the controller 128 to identify the cross-process direction locations of the marks from each ejector with greater accuracy. The second test pattern 675 includes marks that are formed by only a portion of the ejectors that form marks in the test patterns 600 and 650. For example, during the dynamic programming process described above, the controller 128 identifies the marks 612A, 614A, 616A, 618A, 620A, and 622A from the test pattern 600 and corresponding marks printed marks 612B, 614B, 616B, 618B, 620B, and 622B, respectively, in the printed test pattern 650 during the max sum min gap process. The ejectors that correspond to the marks 612A/B-622A/B are also separated from each other by a sufficiently large distance in the cross-process direction to enable the image sensor 116 to clearly distinguish the cross-process direction locations of printed marks from different ejectors in the printhead 104A. The second test pattern 675 also omits marks from some of the ejectors. For example, the mark 610A in the test pattern 600 and corresponding mark 610B in the test pattern have minimal cross-process direction offset. Thus, the position of the printed mark 610B shows little change as the z-axis direction distance between the printhead 104A and a substrate changes, and the controller 128 omits the ejector that forms the marks 610A/610B from the second test pattern 675.

In the printer 100, the controller 128 performs the process 300 for each of the printheads 104A-104C and 108A-108C since the manufacturing processes for the printheads produce ejectors with different degrees of cross-process variation in each printhead. The controller 128 stores the second test pattern data for each of the printheads in the memory 132 with the per-printhead generated test pattern data 142 for use in identification of the z-axis distance between the printheads 104A-104C and 108A-108C and a substrate in the printer 100.

Figure 4:
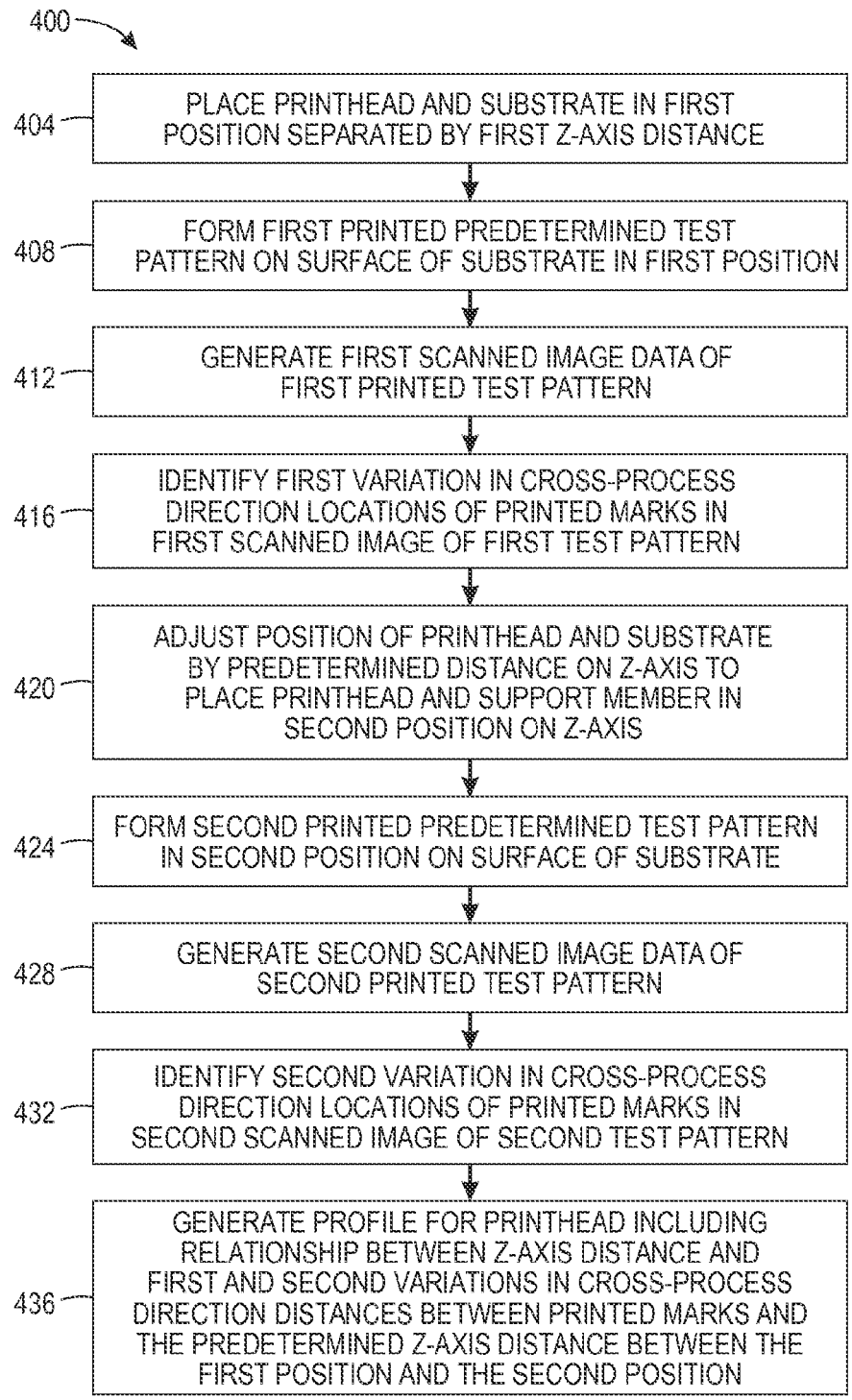
FIG. 4 is a block diagram of a process for generating a profile for a printhead in a three-dimensional object printer that includes a relationship between z-axis distances of the printhead from a substrate and variations in the cross-process direction positions of drops ejected from the printhead at the different z-axis distances.

FIG. 4 depicts a block diagram of a process 400 for generation of a profile between the z-axis distance between a printhead and a substrate and a level of variation of drop placement along the cross-process direction from a printhead in a three-dimensional object printer. In the description below, a reference to the process 400 performing an action or function refers to the operation of a controller in a printer to execute stored program instructions to perform the function or action with other components in the printer. The process 400 is described in conjunction with the printer 100 and FIG. 1A-FIG. 1B, FIG. 2, FIG. 6, and FIG. 7 for illustrative purposes.

Process 400 begins as the printer 100 places a printhead and the substrate in a first position with a first distance of separation along the z-axis (block 404). For example, the controller 128 operates one or both of the actuators 120A and 124 to place the printhead 104A and a substrate in a first position along the z-axis. As described above, the substrate is either the support member 102 or an upper surface of a build material or support material structure that forms a print substrate. For example, in the printer 100 the controller 128 optionally operates the printheads 108A-108C to form a structure of a second build material or support material having a uniform substrate surface that is optically distinct from the material that is ejected from the printhead 104A. The controller 128 forms the printed test pattern on the surface of the structure instead of the surface of the support member in some configurations.

The process 400 continues as the controller 128 operates the printhead 104A to form a test pattern on the surface of the substrate while the printhead and substrate are separated by the first distance along the z-axis (block 408). In the printer 100, the controller 128 uses the per-printhead test pattern data 142 that are generated during the process 300 and stored in the memory 132 to form the second test pattern including marks from ejectors that have been identified as having an increased level of cross-process direction offset in printed marks on the substrate.

Process 400 continues as the image sensor 116 generates image data of the substrate and the second printed test pattern formed on the substrate while the printhead is located at the first distance from the substrate along the z-axis (block 412). In the printer 100, the controller 128 receives the generated image data from the image sensor 116. The controller 128 identifies the a first variation in the cross-process direction locations of the printed marks with reference to the cross-process direction locations and corresponding cross-process direction distances that separate the printed marks in the scanned image of the test pattern (block 416). As used herein, the term "variation" refers to the identified cross-process direction offsets between printed marks in generated image data of the printed test pattern in comparison to the predetermined locations of the printed marks for the test pattern if the printed marks were formed with no cross-process direction offset.

In one embodiment, the controller 128 identifies the variations in the cross-process locations of the marks with reference to the standard deviation in the cross-process direction distances between marks compared to an average cross-process direction distance between the marks in the row sets of the printed test pattern. In one configuration, the controller 128 identifies the variation with reference to the average cross-process direction distance between marks empirically from the scanned image data of the printed test pattern (e.g. the average distance between marks in the scanned image data of the test pattern 650), and subsequently identifies the standard deviation with reference to the empirical average. In another configuration, the controller 128 uses the predetermined cross-process direction separation between marks in the predetermined test pattern (e.g. the cross-process direction separation between marks in the test pattern 600) as the average and identifies the standard deviation with reference to the predetermined average. In another configuration, the controller 128 identifies the standard deviation based on pairs of printed marks. The controller 128 identifies the standard deviation between the cross-process direction distance that separates adjacent printed marks in the test pattern and the average predetermined separation distance between the marks in the predetermined test pattern. In another configuration, the controller 128 identifies the average cross-process direction distance between adjacent groups of marks, and subsequently identifies the standard deviation with reference to the empirical average of the group to which each dash belongs. For example, in one configuration the controller 128 identifies the standard deviation for groups of sixteen dashes in the test pattern and identifies the total variation as an average of the standard deviation values for each group of dashes.

Process 400 continues as the printer 100 adjusts the controller 128 operates one or both of the printhead actuator 120A and support member actuator 124 to move the printhead 104A and substrate by a predetermined distance along the z-axis to a second position with a second separation distance along the z-axis (block 420). The controller 128 operates the printhead 104A to form the second test pattern from the per-printhead test pattern data 142 in the second position (block 424) while the printhead is separated from the substrate by the second distance along the z-axis, generates second image data of the printed test pattern with the image sensor 116 (block 428), and identifies a second variation in the cross-process direction distances between marks in the second generated image data (block 432). The controller 128 operates the inkjets in each printhead using the generated per-printhead test pattern image data 142 that the printer 100 generates during the process 300 to produce the printed test pattern with the increased level of variation between mark locations. The printer 100 performs the processing of blocks 424-432 in substantially the same manner as the processing of blocks 408-416, respectively. The controller 128 identifies a different second variation for the cross-process direction distances between printed marks in the test pattern that is printed in the second z-axis position in comparison to the first variation of the test pattern that is printed in the first z-axis position at two different z-axis distances between the printhead 104A and the substrate. For example, if the printer 100 increases the z-axis distance between the printhead 104A and the substrate in the second position, then the variation level increases because the drops of ejected material from the printhead travel for a longer linear distance to the surface of the substrate. If, however, the second position has a shorter z-axis distance than the first position, then the variation decreases because the drops of ejected material from the printhead travel for a shorter linear distance to the surface of the substrate.

Referring again to FIG. 4, process 400 continues as the controller 128 generates a profile for the printhead 104A including a relationship between the between z-axis distance and the first and second variations in cross-process direction distances between printed marks and the predetermined z-axis distance between the first position and the second position (block 436). In one embodiment, the controller 128 identifies the relationship as a linear relationship between the first and second variation levels on one axis and the predetermined displacement distance along the z-axis between the first and second positions along another axis. The controller 128 stores the generated profile in the memory 132 with the drop variation to z-axis distance profile data 144 in association with the printhead 104A.

Figure 7:
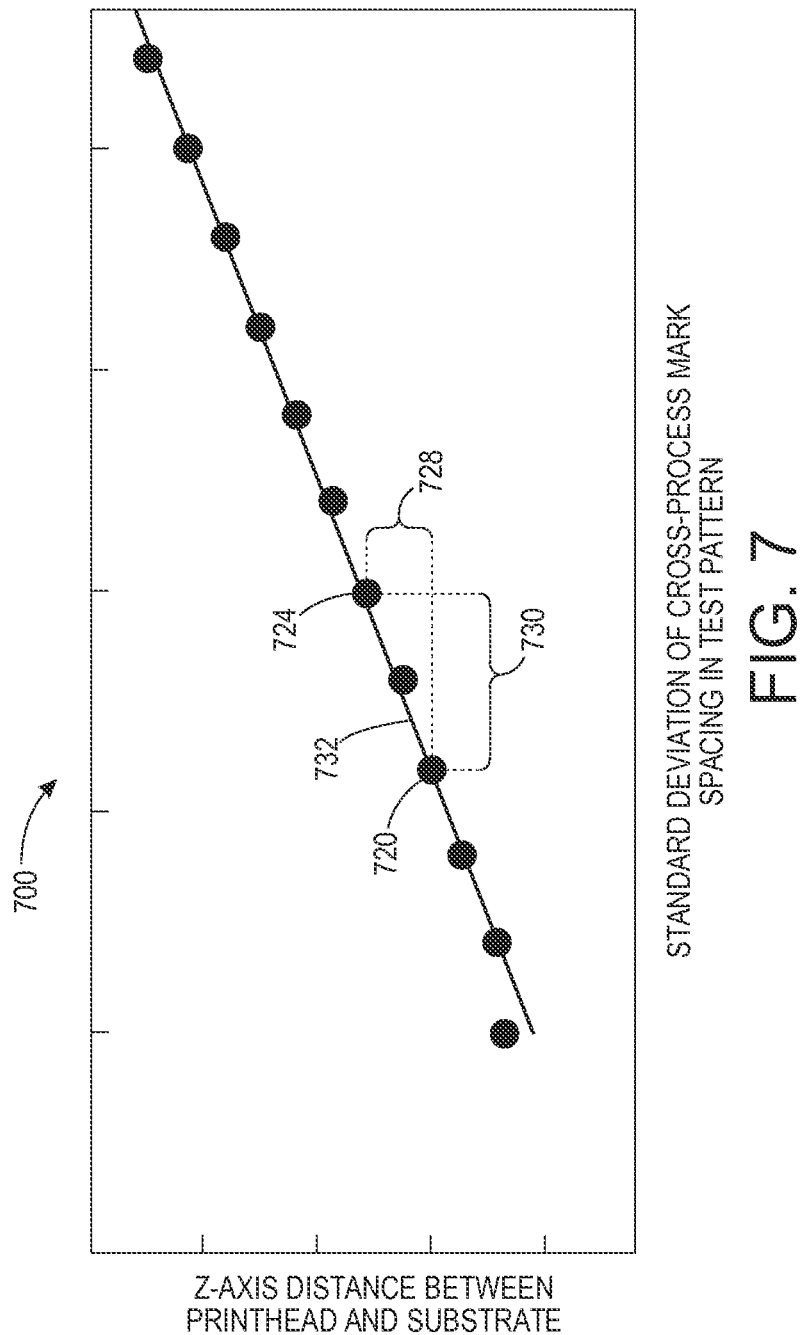
FIG. 7 is a graph depicting a relationship between variations in the cross-process direction positions of drops ejected from a printhead on a surface of a substrate and different z-axis distances between the printhead and the substrate.

FIG. 7 depicts a graph 700 of an example of a relationship between variations in the cross-process direction locations of marks in printed test patterns and z-axis distance in the printhead profile. The graph 700 includes the line 732 that fits the rise 728 corresponding to the predetermined change in the printhead and substrate distances and the run 730 corresponding to the change in identified cross-process direction drop placement variations between the first position variation 720 and the second position variation 724. The graph 700 also includes additional identified variation levels that are generated at different z-axis distances between the printhead and the substrate, and the controller 128 generates the linear relationship 732 as a best-fit line through the different variation levels. While FIG. 7 depicts a linear relationship for the printhead profile, alternative profile embodiments can include curves, splines, or other relationships between the cross-process direction variation levels and z-axis distance.

Figure 5:
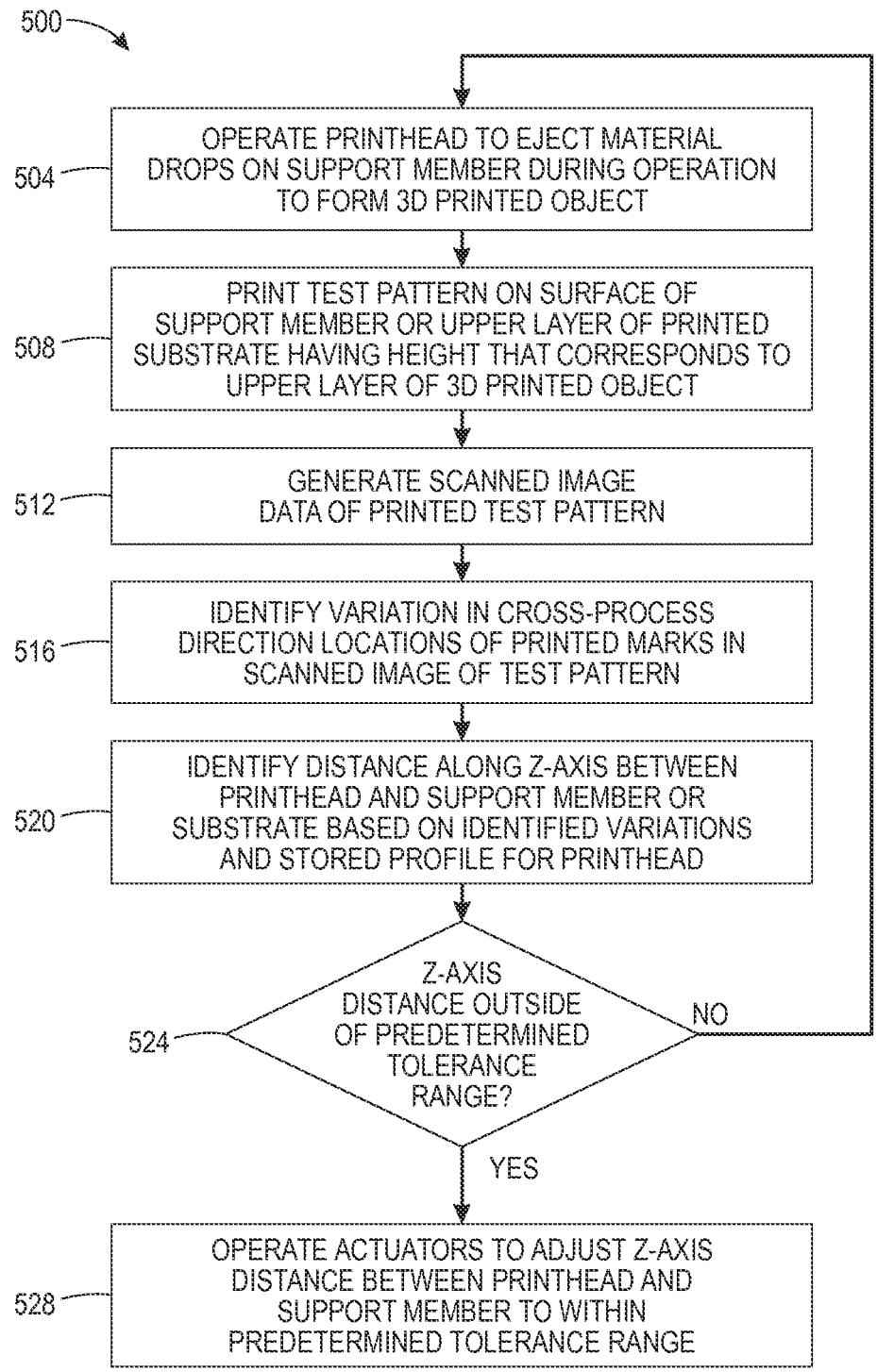
FIG. 5 is a block diagram of a process for identifying a z-axis distance between a printhead and a substrate in a three-dimensional object printer.

FIG. 5 depicts a block diagram of a process 500 for identification of a distance between a printhead and a substrate along a z-axis in a three-dimensional object printer. In the description below, a reference to the process 500 performing an action or function refers to the operation of a controller in a printer to execute stored program instructions to perform the function or action with other components in the printer. The process 500 is described in conjunction with the printer 100 and FIG. 1B for illustrative purposes. The process 500 is described in conjunction with the printhead 104A for illustrative purposes, but the printer 100 performs the same process for some or all of the printheads 104A-104C and 108A-108C.

Process 500 begins as the controller 128 operates the printhead 104A to form a three-dimensional printed object (block 504). During operation in the printer 100, the controller 128 operates the printhead 104A and the other printheads 104B-104C and 108A-108C to form a printed object, such as the printed object 150 that is depicted in FIG. 1B. During the printing process, the controller 128 operates the ejectors in the printhead 104A to form the test pattern on the surface of the substrate with reference the per-printhead test pattern data 142 that is associated with the printhead 104A. In FIG. 1B, the substrate is the support member 102 that receives the test patterns 184, or another substrate surface, such as the upper layer of the object 150, formed on the support member 102 (block 508). In the example of FIG. 1B, the upper layer of the object 150 forms a substrate using an optically distinct material from the printheads 108A-108C to form a surface that contrasts with the printed test pattern 186 from the printhead 104A. In other embodiments, the printheads 104A-104C and 108A-108C form separate substrate structures that correspond to the height of the three-dimensional printed object along the z-axis.

The process 500 continues as the printer 100 generates image data of the printed test patterns with the image sensor 116 (block 512) and the controller 128 identifies variations in the cross-process direction locations of the printed marks in the test pattern with reference to the generated image data (block 516). The controller 128 performs the processing of blocks 512 and 516 in a similar manner to the test pattern scanning and variation identification described above in blocks 412 and 416, respectively, or 424 and 428, respectively, in the process 400.

During process 500, the controller 128 uses the identified variation in the cross-process direction locations of marks in the printed test pattern and the variation to z-axis distance profile data 144 stored in the memory 132 to identify the z-axis distance between the printhead 104A and the substrate (block 520). As described above with regards to FIG. 7, the controller 128 uses the previously generated linear relationship to identify a distance along the z-axis distance between the printhead 104A and the substrate, such as the support member 102 or the upper layer of the object 150. If the identified z-axis distance between the printhead and the substrate is within a predetermined tolerance range (block 524) then the printer 100 continues to use the printhead 104A to form the three-dimensional printed object and the controller 128 optionally performs the process 500 again at a later stage of the printing process. If, however, the z-axis distance between the printhead 104A and the substrate is either too small or too large, then the controller 128 operates either or both of the actuators 120A and 124 to adjust the z-axis distance between the printhead 104A and the substrate to be within the predetermined tolerance range (block 528). For example, in the embodiment of the printer 100 the acceptable z-axis distance is in a range of approximately 0.4 mm to 0.8 mm, although the z-axis distance varies for different three-dimensional object printer embodiments.

In some embodiments, either or both of the first position and second position along the z-axis are at a predetermined measured distance (e.g. 0.5 mm and 1 mm) between the printhead and the substrate. In these embodiments, the controller 128 can use the profile data to identify an absolute distance between the printhead 104A and the substrate, and identify if the z-axis distance is too small or too great for printing operations. However, the printer 100 can generate the profile without absolute z-axis distance measurements between the printhead and the substrate surface. Instead, the controller 128 generates the profile with a known z-axis displacement between the first position and the second position of the printhead and substrate along the z-axis. The controller 128 uses the profile corresponding to the relative z-axis distance between the printhead and the substrate to identify if the printhead is too close or too far from the substrate along the z-axis.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of operating a three-dimensional object printer comprising:
   operating with a controller a plurality of ejectors in a printhead with reference to stored image data to form a first predetermined test pattern including a first plurality of marks arranged in a cross-process direction on a surface of a substrate;
   generating with an image sensor first generated image data of the first plurality of marks on the substrate;
   identifying with the controller a plurality of cross-process direction offsets for the first plurality of marks in the first generated image data of the first predetermined test pattern, each cross-process direction offset being identified with reference to a difference between a location of a mark in the first generated image data and a predetermined location of the mark in the stored image data referenced to form the first predetermined test pattern;
   generating with the controller second test pattern data that correspond to a second plurality of marks arranged in the cross-process direction to be formed by only a portion of the plurality of ejectors in the printhead and without a mark formed by at least one other ejector in the plurality of ejectors, the mark corresponding to the at least one other ejector having an identified cross-process direction offset that is less than another identified cross-process direction offset of at least one ejector in the portion of the plurality of ejectors in the printhead; and
   storing with the controller the second test pattern data in a memory for operation of the portion of the plurality of the ejectors to enable identification of a z-axis distance between the printhead and the substrate, the z-axis being perpendicular to the surface of the substrate.

2. The method of claim 1, the generation of the second test pattern data further comprising:
   identifying with the controller the portion of the plurality of ejectors with reference to a max sum min gap process applied to the plurality of cross-process direction offsets to identify the portion of the plurality of ejectors that form marks in the first plurality of marks with a maximized sum of cross-process direction offsets.

3. The method of claim 2, the max sum min gap process further comprising:
   identifying with the controller the portion of the plurality of ejectors during the max sum min gap process with a predetermined minimum number of ejectors in the plurality of ejectors that are not in the portion of the plurality of ejectors separating ejectors in the portion of the plurality of ejectors that form adjacent marks in the cross-process direction in the second test pattern data.

4. The method of claim 1, the generation of the second test pattern data further comprising:
   generating with the controller the second test pattern data including a plurality of rows of marks formed by the portion of the plurality of ejectors in the printhead.

5. The method of claim 1 further comprising:
   operating with the controller the plurality of ejectors in the printhead with reference to the second test pattern data to form a second test pattern having the second plurality of marks on the surface of the substrate at a first z-axis distance between the printhead and the substrate with reference to the second test pattern data;
   generating with the image sensor second generated image data of the second plurality of marks in the second test pattern on the substrate at the first z-axis distance;
   identifying with the controller a first variation of cross-process direction distances between marks in the second plurality of marks of the second test pattern with reference to the second generated image data;
   operating an actuator to move at least one of the printhead and the substrate along the z-axis by a predetermined offset distance to separate the printhead and the substrate by a second z-axis distance;
   operating with the controller the plurality of ejectors in the printhead with reference to the second test pattern data to form the second test pattern on the surface of the substrate at the second z-axis distance between the printhead and the substrate;
   generating with the image sensor third generated image data of the second test pattern on the substrate at the second z-axis distance;
   identifying with the controller a second variation of cross-process direction distances between marks in the second plurality of marks of the second test pattern with reference to the third generated image data;
   generating with the controller a profile for the printhead with reference to the first variation, the second variation, and the predetermined offset distance, the profile including a relationship between a plurality of variations of cross-process direction distances between marks in test patterns and corresponding z-axis distances between the printhead and the substrate; and
   storing the profile in a memory for use in identification of the z-axis distance between the printhead and the substrate during a printing operation.

6. The method of claim 5, the generation of the profile further comprising:
   generating with the controller a linear relationship between the plurality of variations of cross-process direction distances between marks in printed test patterns and corresponding z-axis distances between the first printhead and the substrate with reference to the first variation, the second variation, and the predetermined z-axis offset distance.

7. The method of claim 1 further comprising:
   operating with the controller the plurality of ejectors in the printhead with reference to the second test pattern data to form a second test pattern having the second plurality of marks on the surface of the substrate;

generating with the image sensor second generated image data of the second test pattern on the substrate;

identifying with the controller a variation of cross-process direction distances between marks in the second plurality of marks of the second test pattern with reference to the second generated image data;

identifying with the controller a z-axis distance between the printhead and the substrate, with reference to the identified variation, the z-axis being perpendicular to the surface of the substrate; and operating with the controller at least one actuator to move at least one of the printhead and the substrate along the z-axis in response to the identified z-axis distance being outside of a predetermined z-axis distance range.

8. The method of claim 7 further comprising:
identifying with the controller the z-axis distance between the printhead and the substrate with reference to a profile stored in the memory, the profile including a relationship between a range of z-axis distances between the first printhead and the substrate and corresponding variations between marks in printed test patterns formed over the range of z-axis distances.

9. A three-dimensional object printer comprising:
a printhead having a plurality of ejectors configured to eject drops of a material onto a surface of a substrate;
an actuator configured to move at least one of the substrate and the printhead along a z-axis;
an image sensor configured to generate image data of the surface of the substrate and test patterns formed on the substrate;
a memory; and
a controller operatively connected to the printhead, the actuator, the image sensor, and the memory, the controller being configured to:
  operate the plurality of ejectors in the printhead with reference to image data stored in the memory to form a first predetermined test pattern including a first plurality of marks arranged in a cross-process direction on the surface of the substrate;
  generate with the image sensor first generated image data of the first plurality of marks on the substrate;
  identify a plurality of cross-process direction offsets for the first plurality of marks in the first generated image data of the first predetermined test pattern, each cross-process direction offset being identified with reference to a difference between a location of a mark in the first generated image data and a predetermined location of the mark in the stored image data referenced to form the first predetermined test pattern;
  generate second test pattern data that correspond to a second plurality of marks arranged in the cross-process direction to be formed by only a portion of the plurality of ejectors in the printhead and without a mark formed by at least one other ejector in the plurality of ejectors, the mark corresponding to the at least one other ejector having an identified cross-process direction offset that is less than another identified cross-process direction offset of at least one ejector in the portion of the plurality of ejectors in the printhead; and
  store the second test pattern data in the memory for operation of the portion of the plurality of the ejectors to enable identification of a z-axis distance between the printhead and the substrate, the z-axis being perpendicular to the surface of the substrate.

10. The three-dimensional object printer of claim 9, the controller being further configured to:
  identify the portion of the plurality of ejectors with reference to a max sum min gap process applied to the plurality of cross-process direction offsets to identify the portion of the plurality of ejectors that form marks in the first plurality of marks with a maximized sum of cross-process direction offsets.

11. The three-dimensional object printer of claim 10, the controller being further configured to:
  identify the portion of the plurality of ejectors during the max sum min gap process with a predetermined minimum number of ejectors in the plurality of ejectors that are not in the portion of the plurality of ejectors separating ejectors in the portion of the plurality of ejectors that form adjacent marks in the cross-process direction in the second test pattern data.

12. The three-dimensional object printer of claim 9, the controller being further configured to:
  generate the second test pattern data including a plurality of rows of marks formed by the portion of the plurality of ejectors in the printhead.

13. The three-dimensional object printer of claim 9, the controller being further configured to:
  operate the plurality of ejectors in the printhead with reference to the second test pattern data to form a second test pattern having the second plurality of marks on the surface of the substrate at a first z-axis distance between the printhead and the substrate with reference to the second test pattern data;
  generate with the image sensor second generated image data of the second plurality of marks in the second test pattern on the substrate at the first z-axis distance;
  identify a first variation of cross-process direction distances between marks in the second plurality of marks of the second test pattern with reference to the second generated image data;
  operate the actuator to move at least one of the printhead and the substrate along the z-axis by a predetermined offset distance to separate the printhead and the substrate by a second z-axis distance;
  operate the plurality of ejectors in the printhead with reference to the second test pattern data to form the second test pattern on the surface of the substrate at the second z-axis distance between the printhead and the substrate;
  generate with the image sensor third generated image data of the second test pattern on the substrate;
  identify a second variation of cross-process direction distances between marks in the second plurality of marks of the second test pattern with reference to the third generated image data;
  generate a profile for the printhead with reference to the first variation, the second variation, and the predetermined offset distance, the profile including a relationship between a plurality of variations of cross-process direction distances between marks in test patterns and corresponding z-axis distances between the printhead and the substrate; and
  store the profile in the memory for use in identification of the z-axis distance between the printhead and the substrate during a printing operation.

14. The three-dimensional object printer of claim 13, the controller being further configured to:
  generate a linear relationship between the plurality of variations of cross-process direction distances between marks in printed test patterns and corresponding z-axis distances between the first printhead and the substrate with reference to the first variation, the second variation, and the predetermined offset distance.

15. The three-dimensional object printer of claim 9, the controller being further configured to:

operate the plurality of ejectors in the printhead with reference to the second test pattern data to form a second test pattern having the second plurality of marks on the surface of the substrate;

generate with the image sensor second generated image data of the second test pattern on the substrate;

identify with the controller a variation of cross-process direction distances between marks in the second plurality of marks of the second test pattern with reference to the second generated image data;

identify with the controller a z-axis distance between the printhead and the substrate, with reference to the identified variation, the z-axis being perpendicular to the surface of the substrate; and operate the actuator to move at least one of the printhead and the substrate along the z-axis in response to the identified z-axis distance being outside of a predetermined z-axis distance range.

16. The three-dimensional object printer of claim 15, the controller being further configured to:

identify the z-axis distance between the printhead and the substrate with reference to a profile stored in the memory, the profile including a relationship between a range of z-axis distances between the first printhead and the substrate and corresponding variations between marks in printed test patterns formed over the range of z-axis distances.

* * * * *